United States Patent Office 3,431,110
Patented Mar. 4, 1969

3,431,110
SUPER-SENSITIZED PHOTOGRAPHIC SILVER HALIDE LIGHT-SENSITIVE MATERIALS
Geoffrey Ernest Ficken, Douglas James Fry, and Elvin Frederick William Thurston, Ilford, Essex, England, assignors to Ilford Limited, Ilford, England, a British company
No Drawing. Filed Apr. 8, 1965, Ser. No. 446,733
Claims priority, application Great Britain, Apr. 20, 1964, 16,271/64
U.S. Cl. 96—104   6 Claims
Int. Cl. G03c 1/28

ABSTRACT OF THE DISCLOSURE

A super-sensitized combination of dyes and photographic silver halide emulsions is disclosed, wherein the emulsions contain dye of the formula:

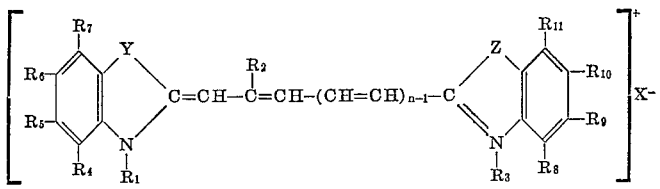

where Y and Z are each selected from the class consisting of —S—, —Se—, —NR$_{12}$ and —CH=CH—, R$_1$ and R$_3$ are each selected from the class consisting of alkyl, carboxyalkyl, carbamoylalkyl and sulphoalkyl, R$_2$ is selected from the class consisting of hydrogen and lower alkyl, R$_5$, R$_6$, R$_9$ and R$_{10}$ taken separately are each selected from the class consisting of hydrogen, halogen, alkyl, aryl, alkoxy and trifluoromethyl, R$_4$ and R$_8$ taken separately are hydrogen, R$_4$ and R$_5$ taken together form part of a benzene ring, R$_8$ and R$_9$ taken together form part of a benzene ring, R$_7$ and R$_{11}$ taken separately are hydrogen, R$_6$ and R$_7$ taken together form part of a benzene ring, R$_{11}$ and R$_{10}$ taken together form part of a benzene ring, R$_{12}$ is selected from the class consisting of alkyl and aryl, n is an integer from 1 to 2 and X is an anion, and a dye of formula:

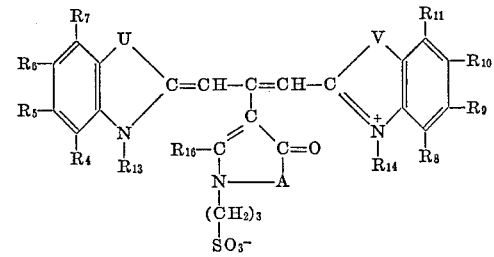

where R$_4$, R$_5$, R$_6$, R$_7$, R$_8$, R$_9$, R$_{10}$ and R$_{11}$ have the values just assigned, and R$_{13}$ and R$_{14}$ are lower alkyl, A is selected from the class consisting of —O— and NR$_{17}$, R$_{16}$ and R$_{17}$ are each selected from the class consisting of hydrogen, alkyl, aralkyl and aryl, and U and V are O.

This invention relates to photographic light-sensitive materials and more particularly to the manufacture of dye-sensitised photographic silver halide emulsions.

Photographic silver halide emulsions have a certain natural sensitivity to light, but this is restricted to a short range of wavelengths in the ultra-violet and/or blue regions of the spectrum. The effect of incorporating a sensitising dye is to impart to the emulsion sensitivity to light of other wavelengths. It has been known for some years that by incorporating in the emulsion together with the sensitising dye a second substance which may or may not itself be a sensitiser, there may sometimes be imparted to the emulsion an additional sensitivity beyond that which can be regarded as the sum effect of the separate substances. Combinations of sensitising dye and another substance which give this better result are known as super-sensitising combinations.

The present invention is based on the discovery of a new supersensitising combination of the type just referred to.

According to the present invention there is provided a photographic silver halide emulsion which contains a sensitising dye of the general Formula I:

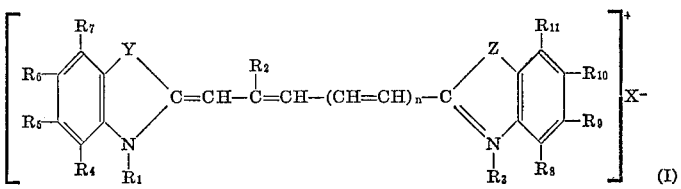

where Y and Z are the same or different and represent —S—, —Se—, —NR$_{12}$, or —CH=CH—. R$_1$ and R$_3$ are the same or different and represent alkyl, carboxyalkyl, carbamoylalkyl or sulphoalkyl, R$_2$ is H or lower alkyl, R$_5$, R$_6$, R$_9$ and R$_{10}$ are the same or different and represent a hydrogen or halogen atom or alkyl, aryl, alkoxy or trifluoromethyl groups, R$_4$ and R$_8$ are the same or different and represent a hydrogen atom or, together with R$_5$ and R$_9$ form part of a benzene ring, R$_7$ and R$_{11}$ are the same or different and represent a hydrogen atom or, together with R$_6$ and R$_{10}$ form part of a benzene ring, R$_{12}$ is alkyl or aryl and n is 0 or 1 and X is an anion, together with a dye of the general Formula II:

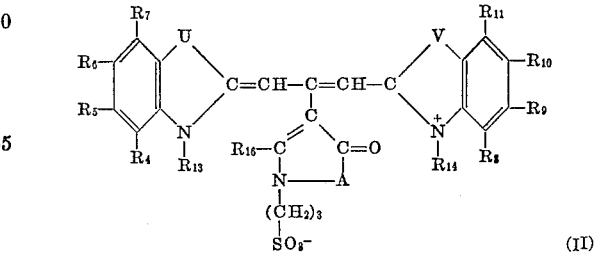

where R$_4$, R$_5$, R$_6$, R$_7$, R$_8$, R$_9$, R$_{10}$ and R$_{11}$ have the values assigned to them above, R$_{13}$ and R$_{14}$ are lower alkyl, A is —O—, or —NR$_{17}$, R$_{16}$ and R$_{17}$ are the same or different and are hydrogen, alkyl, aralkyl or aryl, and when $n$ in Formula I is 0 either U or V must be an oxygen atom, the other is O or S, and when $n$ in Formula I is 1, U and V are the same and are O or S.

It is preferred that $n$ in Formula I is 0 and both U and V in Formula II are O and R$_{13}$ and R$_{14}$ are methyl. In the preferred embodiment of the invention $n$ in Formula I is 0, and Y and Z in Formula I are the same and are either S or Se, and in Formula II U and V are both O, R$_6$ and R$_{10}$ are methoxy and R$_4$, R$_5$, R$_7$, R$_8$, R$_9$ and R$_{11}$ are hydrogen and R$_{13}$ and R$_{14}$ are methyl. By use of a combination of dyes as just set forth, a valuable effect is obtained as illustrated by the specific examples which are set forth later herein.

Referring to the general formulae it is to be noted that where alkyl groups are referred to, these are preferably lower alkyl groups i.e. containing 1 to 4 carbon atoms, e.g. methyl, ethyl and propyl, though they may be higher alkyl groups. Where aralkyl groups are referred to these may be benzyl, naphthylmethyl or the like and where aryl groups are referred to these may be phenyl or naphthyl and may include substituent groups such as alkyl or alkoxy groups or halogen atoms which do not destroy the sensitising action of the compounds.

Examples of alkoxy groups are ethoxy and methoxy. Examples of carboxyalkyl groups are carboxymethyl, carboxyethyl. Examples of carbamoylalkyl are carbamoylethyl and carbamoylmethyl. An example of sulphoalkyl is sulphopropyl.

The symbol X represents any anion but will generally be a halide ion or a sulphate, sulphonate, aryl sulphonate or perchlorate ion.

A supersensitising combination as hereinbefore described finds particular use in increasing the sensitivity of red-sensitized emulsions. Dyes of Formula I are in general red sensitizers. Dyes of Formula II are green sensitizers but in combination in an emulsion an enhancement of the red sensitivity is obtained over the red sensitivity due to the dyes of Formula I without any substantial increase in the green sensitivity of the emulsion.

From 0.01 g. to 0.3 g. of each sensitizing dye per 1.5 g. moles of silver present in the emulsion can conveniently be used.

Most of the dyes of Formula I are known except where R$_5$, R$_6$, R$_9$ and R$_{10}$ represent trifluoromethyl groups. Dyes containing trifluoromethyl substituents can be prepared by the methods described in Belgian Patent No. 648,981.

Dyes of Formula II are prepared by the methods described in Belgian Patent No. 648,046.

The following are illustrative examples of the preparation of supersensitised photographic emulsions according to the invention:

EXAMPLES

The following dyes were employed

Dyes of Formula I (A) Bis-(3-ethyl-2-benzothiazole) trimethincyanine iodide.
(B) Bis-(3-ethyl-5-methyl-2-benzothiazole) trimethincyanine iodide.
(C) Bis-(5-chloro-3-ethyl-2-benzothiazole) trimethincyanine chloride.
(D) Bis-(3,5-dimethyl-2-benzothiazole) β - methyltrimethincyanine bromide.
(E) Bis-(3,5-dimethyl-2 - benzothiazole) β - ethyltrimethincyanine bromide.
(F) Anhydro-bis-(3-2'-sulphoethyl - 2 - benzothiazole) trimethincyanine hydroxide.
(G) Bis-(3-ethyl - 2 - benzoselenazole) trimethincyanine bromide.
(H) Bis-(3-ethyl - 5-methyl-2 - benzoselenazole) trimethincyanine bromide.
(I) Bis - (3-ethyl-5-methoxy-2-benzoselenazole) trimethincyanine bromide.
(J) Bis-(1-ethyl-2-quinoline) trimethincyanine iodide.
(K) Anhydro-(1-phenyl-3-4'-sulphobutyl - 5 - trifluoromethyl-2-benzimidazole) (3-ethyl-2-benzothiazole) trimethincyanine hydroxide.
(L) (3-ethyl-1-phenyl-5-trifluoromethyl - 2 - benzimidazole) (3-ethyl-2-benzothiazole) trimethincyanine iodide.
(M) (3-ethyl-1-phenyl-5-trifluoromethyl - 2 - benzimidazole) (3-ethyl - 2 - benzoselenazole) trimethincyanine iodide.
(N) (3-ethyl-1-phenyl-5-trifluoromethyl - 2 - benzimidazole) (3-ethylnaphtho[1,2d]thiazole - 2) trimethincyanine iodide.
(O) Bis-(3 - ethyl - 2-benzothiazole) pentamethincyanine iodide.
(P) (3-ethyl-5 - trifluoromethyl - 2 - benzothiazole)(1-ethyl-2-quinoline) trimethincyanine iodide.
(Q) Bis-(5-chloro-3-ethyl-2-benzothiazole) β - methyltrimethincyanine chloride.
(R) Bis-(5-chloro-3-ethyl-2-benzothiazole) β-ethyltrimethincyanine chloride.
(S) Bis-(3-ethyl-2-benzothiazole) β - methyltrimethincyanine bromide.
(T) Bis-(3-ethyl-2-benzothiazole) β - ethyltrimethincyanine iodide.
(U) Bis-(3-ethyl-5,6-dimethoxy - 2-benzothiazole) trimethincyanine iodide.
(V) Bis-(3-ethyl-5-phenyl-2-benzothiazole) β-ethyltrimethincyanine iodide.
(W) Bis-(3-ethylnaphtho[2,1d]thiazole-2) β-methyltrimethincyanine toluene-p-sulphonate.
(X) Anhydro-bis-(3-2'-carboxyethyl-5-chloro-2 - benzothiazole) β-ethyltrimethincyanine hydroxide.
(Y) (3-carbamoylmethyl-5,6 - dimethoxy-2 - benzothiazole)(3-ethyl-2-benzothiazole) trimethincyanine iodide.
(Z) Anhydro-(5-chloro-3-3'-sulphopropyl - 2 - benzothiazole)(3-ethyl-5-methyl-2-benzoselenazole) β - ethyltrimethincyanine hydroxide.
(AA) (3 - 2'-carboxyethyl - 5-methyl-2-benzoselenazole) (5-chloro-3 - ethyl-2-benzothiazole) β-ethyltrimethincyanine bromide.

Dyes of Formula II (A') Anhydro-bis-(6 - methoxy-3-methyl-2-benzoxazole) β-(3-methyl - 5-oxo - 2-3'-sulphopropyl-4-isoxazolinyl)-trimethincyanine hydroxide.
(B') Anhydro - bis-(3 - methyl-6-phenyl-2-benzoxazole) β-(3 - methyl-5 - oxo-2-3'-sulphopropyl-4-isoxazolinyl)-trimethincyanine hydroxide.
(C') Anhydro-bis-(3 - methylnaphtho[1,2d]oxazole - 2) β-(3-methyl - 5-oxo - 2-3'-sulphopropyl-4-isoxazolinyl)-trimethincyanine hydroxide.
(D') Anhydro - bis-(3,6 - dimethyl-2-benzoxazole) β-(5-oxo - 1-phenyl-3 - propyl-2-3'-sulphopropyl-4-pyrazolinyl)-trimethincyanine hydroxide.
(E') Anhydro - bis-(6 - methoxy-3-methyl-2-benzoxazole) β-(5-oxo - 1 - phenyl-3-propyl-2-3'-sulphopropyl-4-pyrazolinyl)-trimethincyanine hydroxide.
(F') Anhydro bis-(3,5-dimethyl - 2-benzoxazole) β-(3-methyl-5-oxo-1-phenyl-2 - 3'-sulphopropyl-4 - pyrazolinyl)-trimethincyanine hydroxide.
(G') Anhydro-bis(5-chloro-3-methyl - 2 - benzoxazole) β-(3-methyl - 5-oxo - 1-phenyl - 2-3'-sulphopropyl-4-pyrazolinyl)-trimethincyanine hydroxide.
(H') Anhydro - bis-(3 - methylnaphtho[1,2d]oxazole-2) β-(3 - methyl-5 - oxo-1-phenyl-2-3' - sulphopropyl-4-pyrazolinyl)-trimethincyanine hydroxide.
(I') Anhydro - (3,6-dimethyl - 2-benzoxazole)(3-methyl-2-benzothiazole) β-(3-methyl-5-oxo-1-phenyl-2-3' - sulphopropyl - 4-pyrazolinyl) - trimethincyanine hydroxide.
(J') Anhydro - (3 - methyl-2-benzothiazole)(6-2'-methoxyethoxy - 3-methyl - 2-benzothiazole) β-(3-methyl-5-oxo-1-phenyl-2-3'-sulphopropyl-4-pyrazolinyl) - trimethincyanine hydroxide.
(K') Anhydro - bis(3,5,6 - trimethyl-2-benzoxazole) β-

(3-methyl - 5-oxo - 2-3'-sulphopropyl-4-isoxazolinyl)-trimethincyanine hydroxide.

(L') Anhydro - (3,6-dimethyl - 2-benzoxazole)(6-methoxy-3-methyl - 2-benzoxazole) β - (3-methyl-5-oxo-1-phenyl-2-3'-sulphopropyl - 4-pyrazolinyl)-trimethincyanine hydroxide.

(M') Anhydro - (6-methoxy-3-methyl-2-benzoxazole)(3,5,6 - trimethyl-2-benzoxazole) β-(3-methyl-5 - oxo-1-phenyl-2-3' - sulphopropyl-4-pyrazolinyl)-trimethincyanine hydroxide.

(N') Anhydro-bis - [3-methylnaphtho(2,1d)oxazole-2] β-(3-methyl-5-oxo-1-phenyl-2-3'-sulphopropyl-4 - pyrazolinyl)-trimethincyanine hydroxide.

(O') Anhydro - bis-(6-methoxy-3-methyl-2-benzoxazole) β-(3 - methyl-5-oxo - 1-phenyl-2-3'-sulphopropyl-4-pyrazolinyl)-trimethincyanine hydroxide.

(P') Anhydro - bis - (3,6-dimethyl-2-benzoxazole) β-(1-m-chlorophenyl-3 - methyl - 5-oxo-2-3'-sulphopropyl-4-pyrazolinyl)-trimethincyanine hydroxide.

(Q') Anhydro - bis - (3,5,6-trimethyl-2-benzoxazole) β-(1-m-chlorophenyl-3-methyl - 5 - oxo - 2-3' - sulphopropyl-4-pyrazolinyl)-trimethincyanine hydroxide.

(R') Anhydro - bis - (3-methyl-2-benzoxazole) β - (3-methyl - 5 - oxo-2-3'-sulphopropyl-4-isoxazolinyl)-trimethincyanine hydroxide.

(S') Anhydro - bis - (3,6-dimethyl-2-benzoxazole) β-(5-oxo-1 - phenyl - 2-3'-sulphopropyl-4-pyrazolinyl)-trimethincyanine hydroxide.

(T') Anhydro-bis-(3,6-dimethyl-2-benzoxazole) β-(3-methyl-5-oxo-2-3'-sulphopropyl-1-p-tolyl-4-pyrazolinyl)-trimethincyanine hydroxide.

(U') Anhydro-bis-(3-ethyl-2-benzoxazole) β-(3-methyl-5-oxo-1-phenyl-2-3'-sulphopropyl-4-pyrazolinyl)-trimethincyanine hydroxide.

(V') Anhydro-bis-(3,6-dimethyl-2-benzoxazole) β-(1-benzyl-3-methyl-5-oxo-2-3'-sulphopropyl-4-pyrazolinyl)-trimethincyanine hydroxide.

(W') Anhydro-bis-(3,5,6-trimethyl-2-benzoxazole) β-(3-p-methoxyphenyl-5-oxo-1-phenyl-2-3'-sulphopropyl-4-pyrazolinyl)-trimethincyanine hydroxide.

The combination of a dye of Formula I and a dye of Formula II was added to a fast gelatino silver iodobromide emulsion containing 3.2 mol percent of silver iodide. It was found that the dyes could be added together or separately and either before or after the customary addition of general sensitising agents such as sulphur compounds and gold salts. Where appropriate, control tests were made with either one or the other of the dyes used alone.

The following tables illustrate the effect of the supersensitisation. Speeds were measured with respect to light passing through tricolour red filter in Table (a) and in Table (b) through a deep red filter (Ilford No. 206, described in the Ilford Colour Filters handbook, p. 14), speed being determined as necessary to give a density of 0.1 above fog and being quoted on a log scale in relative terms; higher figures representing higher speeds.

Table (a); n=0 in Formula I

| Dye of Formula I per 1.5 g. mol Ag | Dye of Formula II per 1.5 g. mol Ag | Relative log speed of emulsion |
|---|---|---|
| (A) 0.1 g | | 3.15 |
| (A) 0.1 g | (A') 0.1 g | 3.77 |
| | (A') 0.1 g | 3.20 |
| (A) 0.1 g | | 3.10 |
| (A) 0.1 g | (B') 0.1 g | 3.21 |
| | (B') 0.1 g | 2.85 |
| (A) 0.1 g | | 3.10 |
| (A) 0.1 g | (C') 0.1 g | 3.46 |
| | (C') 0.1 g | 3.12 |
| (A) 0.1 g | | 3.10 |
| (A) 0.1 g | (D') 0.1 g | 3.33 |
| | (D') 0.1 g | 1.96 |
| (A) 0.1 g | | 3.10 |
| (A) 0.1 g | (E') 0.1 g | 3.57 |
| | (E') 0.1 g | 2.90 |
| (B) 0.1 g | | 3.25 |
| (B) 0.1 g | (A') 0.1 g | 3.77 |
| | (A') 0.1 g | 3.20 |
| (C) 0.1 g | | 2.41 |
| (C) 0.1 g | (A') 0.1 g | 3.62 |
| | (A') 0.1 g | 3.20 |
| (D) 0.1 g | | 2.65 |
| (D) 0.1 g | (A') 0.1 g | 3.30 |
| | (A') 0.1 g | 3.20 |
| (E) 0.1 g | | 3.22 |
| (E) 0.1 g | (A') 0.1 g | 3.65 |
| | (A') 0.1 g | 3.20 |
| (F) 0.1 g | | 2.92 |
| (F) 0.1 g | (A') 0.1 g | 3.51 |
| | (A') 0.1 g | 3.16 |
| (G) 0.1 g | | 3.67 |
| (G) 0.1 g | (A') 0.1 g | 4.00 |
| | (A') 0.1 g | 3.20 |
| (G) 0.1 g | | 3.77 |
| (G) 0.1 g | (I') 0.1 g | 3.92 |
| | (I') 0.1 g | 3.77 |
| (H) 0.1 g | | 3.48 |
| (H) 0.1 g | (A') 0.1 g | 3.97 |
| | (A') 0.1 g | 3.16 |
| (I) 0.1 g | | 3.62 |
| (I) 0.1 g | (A') 0.1 g | 3.97 |
| | (A') 0.1 g | 3.16 |
| (J) 0.1 g | | 3.47 |
| (J) 0.1 g | (A') 0.1 g | 3.52 |
| | (A') 0.1 g | 3.16 |
| (K) 0.1 g | | 3.10 |
| (K) 0.025 g | (A') 0.075 g | 3.65 |
| | (A') 0.1 g | 3.25 |
| (K) 0.1 g | | 3.16 |
| (K) 0.06 g | (F') 0.04 g | 3.24 |
| | (F') 0.1 g | 2.89 |
| (K) 0.1 g | | 3.02 |
| (K) 0.025 g | (G') 0.075 g | 3.40 |
| | (G') 0.1 g | 3.15 |
| (K) 0.1 g | | 3.10 |
| (K) 0.025 g | (H') 0.075 g | 3.34 |
| | (H') 0.1 g | 3.30 |
| (L) 0.1 g | | 2.90 |
| (L) 0.1 g | (A') 0.1 g | 3.49 |
| | (A') 0.1 g | 3.20 |
| (M) 0.1 g | | 3.61 |
| (M) 0.1 g | (A') 0.1 g | 3.94 |
| | (A') 0.1 g | 3.20 |
| (N) 0.1 g | | 3.56 |
| (N) 0.1 g | (A') 0.1 g | 3.82 |
| | (A') 0.1 g | 3.25 |
| (P) 0.1 g | | 2.68 |
| (P) 0.1 g | (A') 0.1 g | 3.60 |
| | (A') 0.1 g | 3.15 |
| (Q) 0.1 g | | 3.65 |
| (Q) 0.1 g | (A') 0.1 g | 3.78 |
| | (A') 0.1 g | 3.50 |
| (R) 0.1 g | | 4.00 |
| (R) 0.1 g | (A') 0.1 g | 4.05 |
| | (A') 0.1 g | 3.50 |
| (S) 0.1 g | | 3.73 |
| (S) 0.1 g | (A') 0.1 g | 3.88 |
| | (A') 0.1 g | 3.50 |
| (T) 0.1 g | | 3.36 |
| (T) 0.1 g | (A') 0.1 g | 3.65 |
| | (A') 0.1 g | 3.50 |
| (A) 0.1 g | | 2.84 |
| (A) 0.1 g | (L') 0.1 g | 3.40 |
| | (L') 0.1 g | 2.45 |
| (A) 0.1 g | | 2.84 |
| (A) 0.1 g | (M') 0.1 g | 3.40 |
| | (M') 0.1 g | 2.42 |
| (A) 0.1 g | | 2.84 |
| (A) 0.1 g | (N') 0.1 g | 2.93 |
| | (N') 0.1 g | |

Table (a); n=0 in Formula I

| Dye of Formula I per 1.5 g. mol Ag | Dye of Formula II per 1.5 g. mol Ag | Relative log speed of emulsion |
|---|---|---|
| (A) 0.1 g. |  | 3.25 |
| (A) 0.1 g. | (O') 0.1 g. | 3.81 |
|  | (O') 0.1 g. | 2.89 |
| (A) 0.1 g. |  | 3.25 |
| (A) 0.1 g. | (P') 0.1 g. | 3.53 |
|  | (P') 0.1 g. | 2.05 |
| (A) 0.1 g. |  | 2.84 |
| (A) 0.1 g. | (R') 0.1 g. | 3.03 |
|  | (R') 0.1 g. | 1.60 |
| (A) 0.1 g. |  | 2.84 |
| (A) 0.1 g. | (S') 0.1 g. | 3.09 |
| (A) 0.1 g. |  | 3.25 |
| (A) 0.1 g. | (T') 0.1 g. | 3.54 |
|  | (T') 0.1 g. | 1.55 |
| (A) 0.1 g. |  | 3.25 |
| (A) 0.1 g. | (V') 0.1 g. | 3.41 |
|  | (V') 0.1 g. | 1.64 |
| (C) 0.1 g. |  | 2.47 |
| (C) 0.1 g. | (K') 0.1 g. | 3.20 |
|  | (K') 0.1 gg. | 3.05 |
| (C) 0.1 g. |  | 2.47 |
| (C) 0.1 g. | (Q') 0.1 g. | 3.00 |
|  | (Q') 0.1 g. | 2.44 |
| (C) 0.1 g. |  | 2.47 |
| (C) 0.1 g. | (U') 0.1 g. | 2.54 |
|  | (U') 0.1 g. |  |
| (C) 0.1 g. |  | 2.47 |
| (C) 0.1 g. | (W') 0.1 g. | 2.77 |
|  | (W') 0.1 g. | 2.00 |
| (U) 0.1 g. |  | 3.18 |
| (U) 0.1 g. | (A') 0.1 g. | 3.34 |
|  | (A') 0.1 g. | 3.25 |
| (V) 0.1 g. |  | 3.54 |
| (V) 0.1 g. | (A') 0.1 g. | 3.75 |
|  | (A') 0.1 g. | 3.25 |
| (W) 0.1 g. |  | 3.39 |
| (W) 0.1 g. | (A') 0.1 g. | 3.71 |
|  | (A') 0.1 g. | 3.25 |
| (X) 0.1 g. |  | 3.98 |
| (X) 0.1 g. | (A') 0.1 g. | 4.02 |
|  | (A') 0.1 g. | 3.25 |
| (Y) 0.1 g. |  | 3.56 |
| (Y) 0.1 g. | (A') 0.1 g. | 3.77 |
|  | (A') 0.1 g. | 3.25 |
| (Z) 0.1 g. |  | 4.17 |
| (Z) 0.1 g. | (A') 0.1 g. | 4.24 |
|  | (A') 0.1 g. | 3.25 |
| (AA) 0.1 g. |  | 3.95 |
| (AA) 0.1 g. | (A') 0.1 g. | 4.02 |
|  | (A') 0.1 g. | 3.20 |

Table (b); n=1 in Formula I

| Dye of Formula I per 1.5 g. mol Ag | Dye of Formula II per 1.5 g. mol Ag | Relative log speed of emulsion |
|---|---|---|
| (O) 0.1 g. |  | 1.71 |
| (O) 0.1 g. | (A') 0.05 g. | 2.35 |
| (O) 0.1 g. | (A') 0.1 g. | 2.50 |
|  | (A') 0.1 g. | 1.27 |
| (O) 0.1 g. |  | 1.71 |
| (O) 0.1 g. | (J') 0.05 g. | 2.15 |
| (O) 0.1 g. | (J') 0.1 g. | 2.41 |
|  | (J') 0.1 g. | 1.68 |

NOTE.—Preferred combination of dyes are H and A', I and A', A and O', C and A' and A and A'.

We claim as our invention:

1. A photographic silver halide emulsion which contains a sensitising dye of the formula:

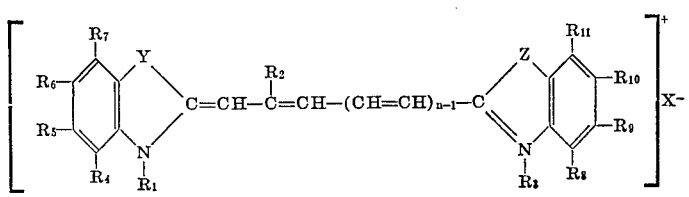

where Y and Z are each selected from the class consisting of —S, —Se, —NR$_{12}$ and —CH=CH—, R$_1$ and R$_3$ are each selected from the class consisting of alkyl, carboxyalkyl, carbamoylalkyl and sulphoalkyl, R$_2$ is selected from the class consisting of hydrogen and lower alkyl, R$_5$, R$_6$, R$_9$ and R$_{10}$ taken separately are each selected from the class consisting of hydrogen, halogen, alkyl, aryl, alkoxy and trifluoromethyl, R$_4$ and R$_8$ taken separately are hydrogen, R$_4$ and R$_5$ taken together form part of a benzene ring, R$_8$ and R$_9$ taken together form part of a benzene ring, R$_7$ and R$_{11}$ taken separately are hydrogen, R$_6$ and R$_7$ taken together form part of a benzene ring, R$_{11}$ and R$_{10}$ taken together form part of a benzene ring, R$_{12}$ is selected from the class consisting of alkyl and aryl, $n$ is an integer from 1 to 2 and X is an anion, together with a dye of the formula:

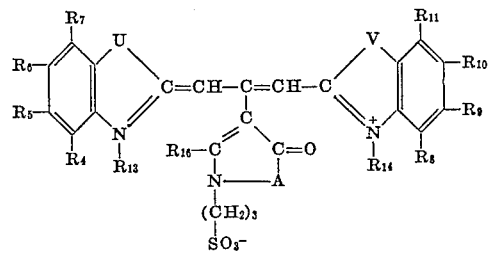

where R$_4$, R$_5$, R$_6$, R$_7$, R$_8$, R$_9$, R$_{10}$ and R$_{11}$ have the values just assigned, R$_{13}$ and R$_{14}$ are lower alkyl, A is selected from the class consisting of —O and NR$_{17}$, R$_{16}$ and R$_{17}$ are each selected from the class consisting of hydrogen, alkyl, aralkyl and aryl, and U and V are O.

2. A photographic silver halide emulsion which contains bis-(3-ethyl-5-methyl-2-benzoselenazole)trimethincyanine bromide and anhydro-bis-(6-methoxy-3-methyl-2-benzoxazole) β-(3-methyl-5-oxo-2-3'-sulphopropyl-4-isoxazolinyl)-trimethincyanine hydroxide.

3. A photographic silver halide emulsion which contains bis-(3-ethyl-5-methoxy-2-benzoselenazole)trimethincyanine bromide and anhydrobis-(6-methoxy-3-methyl-2-benzoxazole) β-(3-methyl-5-oxo-2-3'-sulphopropyl-4-isoxazolinyl)-trimethincyanine hydroxide.

4. A photographic silver halide emulsion which contains bis-(3-ethyl-2-benzothiazole)trimethincyanine iodide and anhydro-bis-(6-methoxy-3-methyl-2-benzoxazole)-β-(3-methyl-5-oxo-1-phenyl-2-3'-sulphopropyl-4-pyrazolinyl)-trimethincyanine hydroxide.

5. A photographic silver halide emulsion which contains bis-(5-chloro-3-ethyl-2-benzothiazole)trimethincyanine chloride and anhydro-bis-(6-methoxy-3-methyl-2-benzoxazole)β-(3-methyl-5-oxo-2-3′-sulphopropyl-4-isoxazolinyl)-trimethincyanine hydroxide.

6. A photographic silver halide emulsion which contains bis-(3-ethyl-2-benzothiazole)trimethincyanine iodide and anhydro-bis(6-methoxy-3-methyl-2-benzoxazole)β-(3-methyl-5-oxo-2-3′-sulphopropyl-4-isoxazolinyl)-trimethincyanine hydroxide.

References Cited

UNITED STATES PATENTS

| 2,704,714 | 3/1955 | Carroll et al. | 96—104 |
| 3,177,210 | 4/1965 | Rosenoff | 96—102 |

J. TRAVIS BROWN, *Primary Examiner.*

U.S. Cl. X.R.

96—105